United States Patent Office 3,438,443
Patented Apr. 15, 1969

3,438,443
SILICA-DISSOLUTION PREVENTION IN OIL
RECOVERY
Michael Prats and Evan H. Street, Jr., Houston, Tex., and
Wayne A. Harthorn, Los Angeles, Calif., assignors to
Shell Oil Company, New York, N.Y., a corporation
of Delaware
No Drawing. Filed July 13, 1967, Ser. No. 653,037
Int. Cl. E21b 43/24
U.S. Cl. 166—303                      5 Claims

ABSTRACT OF THE DISCLOSURE

The heating of a permeable siliceous earth formation by injecting a hot aqueous fluid having a liquid phase is improved by converting the liquid phase to an aqueous solution that is substantially saturated with dissolved silica.

---

The present invention is directed to a method of heating permeable siliceous earth formations in conjunction with oil production, fluid mining, and the like processes. More particularly, this invention is directed to a method of inhibiting or preventing a dissolution of siliceous material that might release solid particles of an earth formation and allow them to move into and damage equipment within a wall. The invention is applicable to processes in which hot aqueous fluids are injected into a siliceous earth formation at at least one location to displace fluids toward a different location from which fluids are produced as well as to processes in which the injection of hot aqueous fluid is alternated with the production of fluid through the same opening into the earth formation.

BACKGROUND OF THE INVENTION

Many earth formations contain siliceous material, such as silica, silicates, or the like, either in the form of grains or in the form of intergranular bonding materials. Such earth formations are generally referred to as siliceous earth formations. Siliceous earth formations can be artificially produced. For example, a siliceous earth formation is produced when an unconsolidated carbonate sand is consolidated by treating it with a material, such as water glass, that forms a siliceous cementing material between the grains.

It is often desirable to heat a permeable siliceous earth formation by injecting a hot aqueous fluid, such as a hot water or a low quality or low grade steam, i.e., a hot aqueous fluid, that contains a liquid phase, in order to conduct a fluid mining, oil recovery, or the like operation. In such heating processes, there is a tendency for the earth formations to become less competent and to allow particles to move into the well. Such "sand intrusion" problems are particularly prevalent in thermal backflow operations in which the same well is operated cyclically to first inject a heating fluid and then to produce fluid. Where a well is operated continuously to inject heated aqueous fluid, the dissolution of silica can cause the surrounding sand to become so incompetent that the well will be damaged by slumping sand, particularly if the injection pressure is lowered. In addition, in such a situation, the injected fluid can move dissolution-released sand grains into smaller pores which then become plugged and cause more pressure to be required in order to inject fluids. The required injection pressure may become so large that a selected rate of fluid injection cannot be maintained without fracturing the reservoir.

Where a well is completed into an incompetent earth formation, it is usually protected by means of screens, liners, gravel packs or other types of mechanical devices for keeping sand from entering the well. Alternatively, or additionally, such incompetent formations are often consolidated by means of artificial cementing materials such as silicates, polymeric resins, carbohydrates or the like, or by means of thermally converting oil into an intergranular-binding coke, fusing together portions of the sand grains, or by the like procedures. Various sand controlling measures are described in U.S. Patents 3,175,611; 3,121,462; 3,250,329; 3,205,946; 3,291,214 and 3,292,701.

The in situ treatment of sand with artificial cementing materials is particularly advantageous in treating the upper zones of dual completion wells. The in situ treatments form a ring of competent porous sand within the earth formations around the well and leave the boreholes open for the runnig in and operating of equipment for producing from lower reservoir intervals. Such treatments are effective because they cement each sand grain to the adjacent sand grains. If an inflow of hot aqueous fluid dissolves some of the so-bonded sand grains and thus removes the support for the neighboring grains, the consolidated sand is soon converted to one that is unconsolidated.

An object of the present invention is to heat subsurface siliceous formations effectively and economically.

Another object of this invention is to recover hydrocarbons from siliceous formations by using aqueous heating fluids which are rendered essentially inert to chemical reaction with the siliceous materials in the formations.

Still another object of this invention is to recover oil from siliceous formations by using a heated aqueous fluid which is essentially inactive toward reaction with the siliceous material present in the formation and which inhibits and prevents sand intrusion due to the sloughing and collapsing of the siliceous formations.

Still another object of this invention is to recover oil from silica-containing formations with a chemically compounded mixture of steam and hot aqueous solution which prevents or inhibits dissolution of silica and thereby improves oil recovery efficiency.

These and other objects will become apparent from the following description of the invention.

SUMMARY OF THE INVENTION

Broadly, this invention is a process for treating a hot, at least partially liquid, aqueous fluid that is being injected into a siliceous earth formation by mixing the fluid with siliceous material and converting the liquid phase to a solution that is substantially saturated with dissolved silica at a temperature exceeding the earth formation temperature. More particularly, the invention is a process for reducing the sand intrusion problem in a well which is operated first to inject a hot aqueous fluid, such as a hot water or a low-quality steam having a liquid phase, into a siliceous earth formation and then to produce fluid from the earth formation. The liquid phase of the injected fluid is converted to a solution that is saturated with dissolved silica to the extent of substantially inhibiting the dissolving of siliceous material from the earth formation. In general, this requires that the liquid phase of such a fluid contain more than about half of the amount of dissolved silica acid that is required to saturate the liquid at a temperature that exceeds the temperature in the earth formation.

This invention is particularly applicable to a thermal backflow oil production process that uses a low quality or low grade steam, i.e., steam mixed with a significant proportion, such as about 20 percent by weight, of an aqueous solution of inorganic material. In steam soaks using low-grade steam such aqueous solutions usually have a relatively high pH and they are injected into an oil reservoir from which fluid is subsequently produced. In such operations the sand intrusion problems are often severe, due to the tendency of the aqueous liquids to dissolve siliceous components of the earth formation and thus to release solid materials which then become entrained in the fluids flowing back into the well.

DESCRIPTION OF THE PREFERRED EMBODIMENT

It has been observed that a dissolution of silica tends to occur whenever the grains of a siliceous earth formation, or naturally or artificially deposited siliceous material that forms an intergranular cementing material in a subterranean earth formation, are contacted with a flowing stream of a hot aqueous liquid containing an insignificant amount of dissolved silica. Such a silica dissolution tends to release the earth formation grains and allow them to slump into the well or to become entrained in fluids injected into, or produced from, the earth formation. The expense and difficulty of operating a well are increased by either or both the slumping and entrainment of the granular materials. The slumping of the sand necessitates sand washing or bailing operations and/or the repair of damaged pumps, screens, packers, etc. The entrainment of sands tends to plug portions of the earth formation into which fluids are being injected, or screens or liners through which fluids are being produced, to erode pumps and conduits, etc.

It has now been discovered that when the liquid phase of a hot fluid mixture such as a steam-water mixture contains sufficient dissolved silica to form an aqueous solution that is saturated to a significant extent at an injection temperature exceeding the temperature in a siliceous earth formation, the inflowing liquid tends to dissolve little or no additional silica from a siliceous earth formation, due to the fact that the inflowing liquid contains at least substantially all of the silica it can dissolve at the temperature of the earth formation. When such an aqueous liquid is brought into contact with the earth formation, it becomes cooler and may even deposit silica on the intergranular surfaces of the earth formation.

In respect to the amount of dissolved silica that should be used in the liquid phase of a hot aqueous fluid being injected into a siliceous earth formation, the pH of the solution is a factor. In aqueous solutions containing silicates at a pH greater than 7, silicate ions are present as well as monosilicic acid and the solubility of silica in such solutions is greater than that of solutions of lower pH. In general, preferred solutions should be at least about 70 percent saturated with silica at the pH and the temperature at which they are injected, and should be injected at a temperature exceeding that in the earth formation so as to essentially prevent dissolution of silica in the earth formation.

The mixing of the steam with aqueous solution of silica can be completely or partially effected at either a surface or a subsurface location and the aqueous solution can contain one or a plurality of siliceous materials. The pH of such solutions can also be controlled by the addition of acidic or basic materials. Where a mixture of steam and an aqueous solution of silica is pumped through a well, from a surface location to a subsurface earth formation, it is important to adjust the fluid temperature and disolved silica content so that the fluid which enters the earth formation has an aqueous liquid phase that is a substantially saturated solution of dissolved silica at a temperature exceeding that in the earth formation. If the siliceous material is added at the surface, the amount should be sufficient to saturate the additional liquid that will form as steam condenses due to heat losses in the well conduits.

The present process can be used to improve the consolidation of a reservoir, particularly in conducting a thermal soaking operation. For example, during the injection of the last portions of hot water or steam and hot water it is advantageous to saturate the liquid phase with dissolved silica at a temperature significantly greater than that in the earth formation. When such silica-saturated portions have entered the earth formation, they are allowed to cool to the temperature in the earth formation and deposit silica before fluid is produced during the backflow cycle. In the respect to hot aqueous fluid, the solubility of silica (quartz) has been found to be about 500 p.p.m. at a temperature of about 250° C., in the liquid phase, but essentially negligible in the vapor phase. However, as the temperature approaches the critical point of water (374° C.) the solubility of the quartz in vapor phase increases. Also, the solubility of quartz in alkaline water has been noted to be greater than in neutral water.

In producing low-grade steam of essentially 75–99 percent or higher steam-content from normally available water, the feed water is usually treated with alkaline compounds in order to decrease water hardness for the protect- of steam equipment and equipment coming in contact with steam. When low quality steam is so produced, the resultant treatment normally renders the aqueous phase of the steam alkaline (pH 10–11). Also, unavoidable thermal losses during steam injection through the tubing string and in the formation may result in increased amounts of alkaline water.

In practicing the invention, these factors should be taken into consideration to make sure than an inflowing hot aqueous fluid such as a mixture of steam and silicate-containing aqueous liquid, contains sufficient dissolved silica, such as monosilicic acid and/or silicates capable of forming monosilicic acid, so that the liquid phase is saturated to the extent of being incapable of dissolving silicates present in the formation even after heat loss is taken into account. Thus, taking into consideration the heat losses and solubility of silica in water at different pH, appropriate adjustments in silica concentration of the mixture at the wellhead or just prior to its coming in contact with the siliceous earth formation, should be made to assure that the fluid is saturated so as to prevent silica dissolution in the formation.

Many materials other than silica (quartz) which contain silica are capable of forming detectable amounts of dissolved silica such as monosilicic acid in an aqueous liquid solution. Such materials include alkali metal silicates such as sodium orthosilicate ($Na_4SiO_4$), sodium metasilicate ($Na_2SiO_3$), sodium disilicate ($Na_2Si_2O_5$), water glass (sodium polysilicate or $Na_2O.3.2SiO_2$), colloidal silica, etc., which are soluble sodium silicates. Also, corresponding soluble potassium silicates as well as other akali metal silicates such as solid amphorous (silica gel) which can yield monosilicic acid in equilibrium with water can be used. Even glasses with silica to alkali ratios higher than 3.2 to 1 can be used as well as any solid or liquid material yielding a sufficient concentration of dissolved silica can serve as a formation protective agent.

The invention can be carried out effectively by simply adding sufficient silica, water glass, etc., to a stream of steam at a wellhead, both to allow for the formation of additional liquid phase, due to heat loss, and to render such an aqueous liquid phase inert in respect to the dissolving of silica. Any soluble silicate or colloidal silicate which could supply dissolved silica to an aqueous liquid solution could be substituted for water glass. Adjustment of the pH at this point, if necessary, might prove to be beneficial. As an alternate, solid materials might be substituted for the water glass, i.e., the injection stream of steam and hot water could be passed through a column containing sand or silica gel or soda-silica glass, all of which are more soluble than quartz. It may be necessary under certain conditions to pass only a portion of the injection stream through the silica packed tube to maintain the necessary monosilicic acid level.

Experiments have indicated that, in respect to an aqueous liquid at a temperature of about 390° to 480° F. under a pressure of about 225 to 575 p.s.i., about 75% of the equilibrium monosilicic acid concentration was attained by flowing the stream through sand packs at practical flow rates. The sand packs contained sand-size grains of relatively pure quartz. Also experiments have indicated that water glass solutions with silica concentrations of about 400 p.p.m. and higher undergo a decrease in silicate concentration when contacted with sand and thus would have protected a sand formation from silica leaching.

Samples of silicate material consolidated sands were prepared by treating unconsolidated sands with an emulsion of water glass and kerosene followed by an aqueous solution of calcium chloride. Such treatments produced competent consolidated sands in which the grains are interbonded by relatively insoluble silicate materials. Samples of such consolidated sands were immersed in and found to be stable in cold water, but were converted to unconsolidated sand within three to four hours immersion in boiling water. Tests in heated portions of other aqueous liquids indicated that, in general, aqueous liquids containing salts such as sodium aluminate and the like, which are capable of forming insoluble silicates such as aluminosilicates, degrade the consolidated sands almost as rapidly as a fresh water.

On the other hand, when samples of the above silicate consolidated sands were boiled in dilute water glass solutions containing about 1000 parts per million of $SiO_2$, in spite of the fact that such solutions have a relatively high pH of about 10.6, no significant loss of compressive strength occurred after six hours exposure to the boiling liquid. Similarly, experiments in which such dilute silicate solutions were heated and flowed through the consolidated sand, established that the degradation of the consolidation was inhibited.

The foregoing description of the invention is merely intended to be explanatory thereof. Various changes in the details of the described method may be made, within the scope of the appended claims, without departing from the spirit of the invention.

We claim as our invention:

1. A process for heating a permeable subsurface siliceous earth formation for facilitating fluid production therefrom, which process comprises:
   dissolving siliceous material in the liquid phase of a hot aqueous fluid that contains at least some aqueous liquid;
   adjusting the fluid temperature and siliceous material concentration of the aqueous fluid to the extent required to provide a fluid containing an aqueous liquid phase that is a substantially saturated solution of dissolved silica at a temperature exceeding that in the permeable subsurface siliceous earth formation; and,
   injecting the so-adjusted aqueous fluid into the permeable subsurface siliceous earth formation in a volume sufficient to form a stream of hot aqueous liquid that flows through the ring-shaped portion of the earth formation that is usually protected by sand controlling measures whereby the earth formation is heated without dissolving siliceous components and decreasing the extent to which the formation is competent.

2. The process of claim 1 wherein the heated aqueous fluid is a mixture of steam and aqueous liquid.

3. The process of claim 1 wherein the siliceous material which is dissolved in the liquid phase of the hot aqueous fluid is an alkali metal silicate.

4. The process of claim 1 wherein the concentration of the siliceous material in the liquid phase of the hot aqueous fluid is adjusted to the extent required to provide an aqueous liquid phase that is more than about 70 percent saturated with dissolved silica at the temperature at which it is injected into the earth formation.

5. A thermal backflow process for producing oil from an oil reservoir, which comprises:
   producing a mixture of steam and aqueous liquid;
   dissolving siliceous material in the liquid phase of said mixture;
   adjusting the temperature and siliceous material concentration of said mixture to the extent required to provide fluid that has a temperature at which the reservoir oil is a mobile liquid and a liquid phase which is substantially saturated with dissolved silica;
   injecting the so-adjusted mixture into the oil reservoir; and
   subsequently backflowing fluid from the location through which the so-adjusted mixture was injected into the oil reservoir to produce oil from the reservoir.

References Cited

UNITED STATES PATENTS

| 3,055,423 | 9/1962 | Parker | 166—25 X |
| 3,070,159 | 12/1962 | Marx | 166—25 X |
| 3,193,009 | 7/1965 | Wallace et al. | 166—40 X |
| 3,205,946 | 9/1965 | Prats et al. | 166—25 |
| 3,259,186 | 7/1966 | Dietz | 166—40 |

FOREIGN PATENTS 1,351,075  3/1963  France.

STEPHEN J. NOVOSAD, *Primary Examiner.*

U.S. Cl. X.R.

166—305